United States Patent
Bush et al.

(10) Patent No.: US 11,307,039 B2
(45) Date of Patent: Apr. 19, 2022

(54) COMBINING HETEROGENEOUS TYPES OF MAPS

(71) Applicant: GM GLOBAL TECHNOLOGY OPERATIONS LLC, Detroit, MI (US)

(72) Inventors: Lawrence A. Bush, Shelby Township, MI (US); Michael A. Losh, Rochester Hills, MI (US); Aravindhan Mani, Troy, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 16/439,188

(22) Filed: Jun. 12, 2019

(65) Prior Publication Data

US 2020/0393252 A1    Dec. 17, 2020

(51) Int. Cl.
*G01C 21/32* (2006.01)
*G01C 21/36* (2006.01)

(52) U.S. Cl.
CPC ......... *G01C 21/32* (2013.01); *G01C 21/3617* (2013.01); *G01C 21/3644* (2013.01)

(58) Field of Classification Search
CPC ............... G01C 21/32; G01C 21/3617; G01C 21/3614; G01C 21/3644; G01C 21/3676; G01C 21/367
See application file for complete search history.

(56) References Cited

U.S. PATENT DOCUMENTS

2020/0184259 A1* 6/2020 Viswanathan ......... G06K 9/627
2020/0218742 A1* 7/2020 Jones .................... G06F 16/248

OTHER PUBLICATIONS

English Translation of Publication CN 107764263 B Author: Wang et al. Title: A Generating Method and Device of Lane Number Earlier Publication Date: Mar. 6, 2018 (Year: 2018).*

* cited by examiner

*Primary Examiner* — James J Lee
*Assistant Examiner* — Steven Vu Nguyen
(74) *Attorney, Agent, or Firm* — Cantor Colburn LLP

(57) ABSTRACT

A system for generating a map includes a processing device configured to determine a provenance of each received map of a plurality of maps, parse each received map into objects of interest, and compare the objects of interest to identify one or more sets of objects representing a common feature. For each set of objects, the processing device is configured to select a subset of the set of objects based on the provenance associated with each object in the set of objects, and calculate a similarity metric for each object in the subset. The similarity metric is selected from an alignment between an object and a reference object in the subset, and/or a positional relationship between the object and the reference object. The processing device is configured to generate a common object representing the common feature based on the similarity metric, and generate a merged map including the common object.

12 Claims, 5 Drawing Sheets

COMBINING HETEROGENEOUS TYPES OF MAPS

INTRODUCTION

The subject disclosure relates to the art of mapping and navigation and, more particularly, to a system and method for generating a map and/or merging maps.

Modern vehicles and drivers increasingly rely on mapping and navigation systems. For example, many drivers utilize mapping programs, such as mobile device and onboard map applications, for navigation. In addition, vehicles are increasingly equipped with sensors and controllers to facilitate autonomous operation or semi-autonomous operation (e.g., adaptive cruise control, collision avoidance, automated braking). User navigation and autonomous operation can be affected by the level of detail and accuracy of available maps. In many instances, available maps are retrieved from different sources and are of different types. Effectiveness of navigation and location determination may be dependent on the ability to analyze and combine information from maps of different types.

SUMMARY

In one exemplary embodiment, a system for generating a map includes a processing device including an input module configured to receive a plurality of maps of a region. The processing device configured to perform determining a provenance of each received map of the plurality of maps, parsing each received map into objects of interest representing features of interest in the region, and comparing the objects of interest from the plurality of maps to identify one or more sets of objects, each set of objects representing a common feature. For each set of objects, the processing device is configured to perform selecting a subset of the set of objects based on the provenance associated with each object in the set of objects, calculating a similarity metric for each object in the subset. The similarity metric is selected from an alignment between an object in the subset and a reference object in the subset, and/or a positional relationship between the object in the subset and the reference object in the subset. The processing device is further configured to perform generating a common object representing the common feature from at least one object in the subset based on the similarity metric, and generating a merged map including the common object.

In addition to one or more of the features described herein, the provenance associated with an object is estimated based on at least one of a source and a resolution of a received map corresponding to the object.

In addition to one or more of the features described herein, calculating the similarity metric includes selecting an object from the subset as the reference object, and estimating a distance from the reference object to each other object in the subset.

In addition to one or more of the features described herein, the objects of interest include one or more lane objects, each one or more lane object representing a segment of a road lane.

In addition to one or more of the features described herein, the reference object is selected based on the provenance associated with the reference object and a length of the reference object.

In addition to one or more of the features described herein, the processing device is configured to estimate a length of each object in the subset, and merge objects having a length that is shorter than a selected length.

In addition to one or more of the features described herein, wherein the processing device is configured to generate the common object based on calculating a weighted average of a lateral position of each object relative to the reference object.

In addition to one or more of the features described herein, calculating the weighted average includes assigning a weight to each object in the subset based on the provenance.

In addition to one or more of the features described herein, the similarity metric for each object in the subset is an alignment metric based on a projection of each object onto the reference object.

In addition to one or more of the features described herein, the similarity metric for each object in the subset is an alignment metric based on at least one of: a projection of each object onto the reference object, and an angular heading of each object relative to the reference object.

In addition to one or more of the features described herein, the processing device is part of a vehicle or in communication with the vehicle.

In one exemplary embodiment, a method for generating a map includes receiving a plurality of maps of a region by a processing device, determining a provenance of each received map of the plurality of maps, parsing each received map into objects of interest representing features of interest in the region, and comparing the objects of interest from the plurality of maps to identify one or more sets of objects, each set of objects representing a common feature. The method also includes, for each set of objects, selecting a subset of the set of objects based on the provenance associated with each object in the set of objects, and calculating a similarity metric for each object in the subset. The similarity metric is selected from an alignment between an object in the subset and a reference object in the subset, and/or a positional relationship between the object in the subset and the reference object in the subset. The method further includes, for each set of objects, generating a common object representing the common feature from at least one object in the subset based on the similarity metric, and generating a merged map including the common object.

In addition to one or more of the features described herein, the provenance associated with an object is determined based on at least one of a source and a resolution of a received map corresponding to the object.

In addition to one or more of the features described herein, calculating the similarity metric includes selecting an object from the subset as the reference object, and estimating a distance from the reference object to each other object in the subset.

In addition to one or more of the features described herein, the objects of interest include one or more lane objects, each one or more lane object representing a segment of a road lane.

In addition to one or more of the features described herein, the reference object is selected based on the provenance associated with the reference object and a length of the reference object.

In addition to one or more of the features described herein, generating the common object includes estimating a length of each object in the subset, and merging objects having a length that is shorter than a selected length.

In addition to one or more of the features described herein, the common object is generated based on calculating a weighted average of a lateral position of each object relative to the reference object.

In addition to one or more of the features described herein, calculating the weighted average includes assigning a weight to each object in the subset based on the provenance.

In addition to one or more of the features described herein, the similarity metric for each object in the subset is an alignment metric based on a projection of each object onto the reference object.

In addition to one or more of the features described herein, the similarity metric for each object in the subset is an alignment metric based on at least one of: a projection of each object onto the reference object, and an angular heading of each object relative to the reference object.

In addition to one or more of the features described herein, the processing device is part of a vehicle or in communication with the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Figure 1:
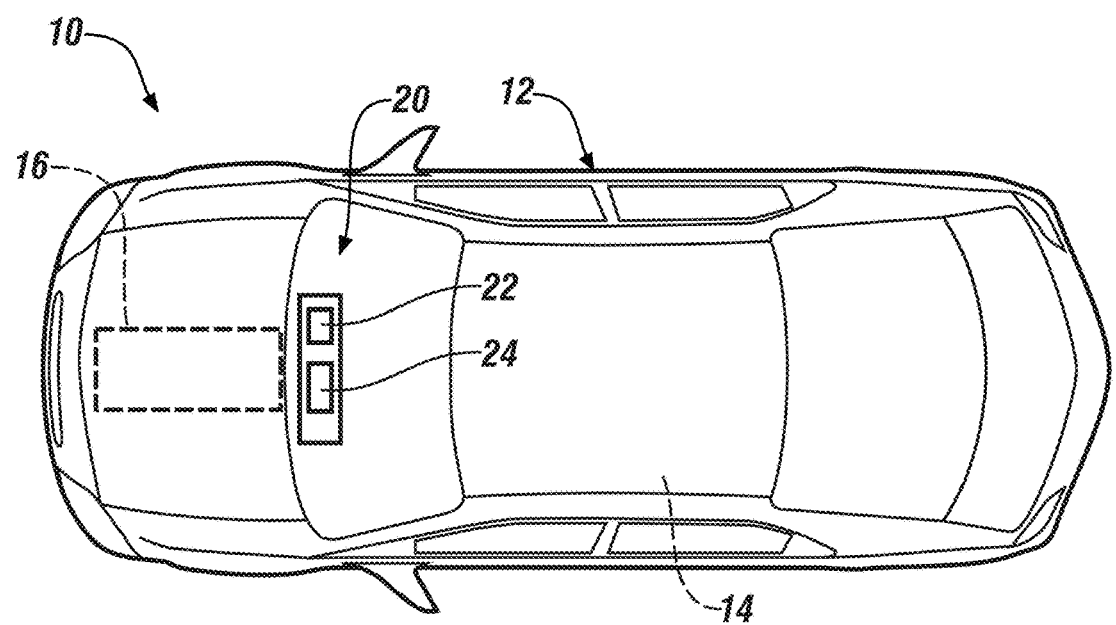
FIG. 1 is a top view of a motor vehicle including a navigation system.

FIG. 1 shows an embodiment of a motor vehicle 10, which includes a vehicle body 12 defining, at least in part, an occupant compartment 14. The vehicle body 12 also supports various vehicle subsystems including an engine assembly 16, and other subsystems to support functions of the engine assembly 16 and other vehicle components, such as a braking subsystem, a steering subsystem, a fuel injection subsystem, an exhaust subsystem and others.

The vehicle 10, in one embodiment, includes aspects of a mapping or map generation system 20, which can be incorporated into, or in communication with, one or more processing devices 22. An example of a processing device 22 is shown in FIG. 1, which can be operated or interacted with by a user via a user interface 24. The map generation system 20 can utilize the processing device 22, for example, to receive maps and generate a merged map, communication with remote processing devices, and/or receive a merged map generated by a remote processing device.

Figure 2:
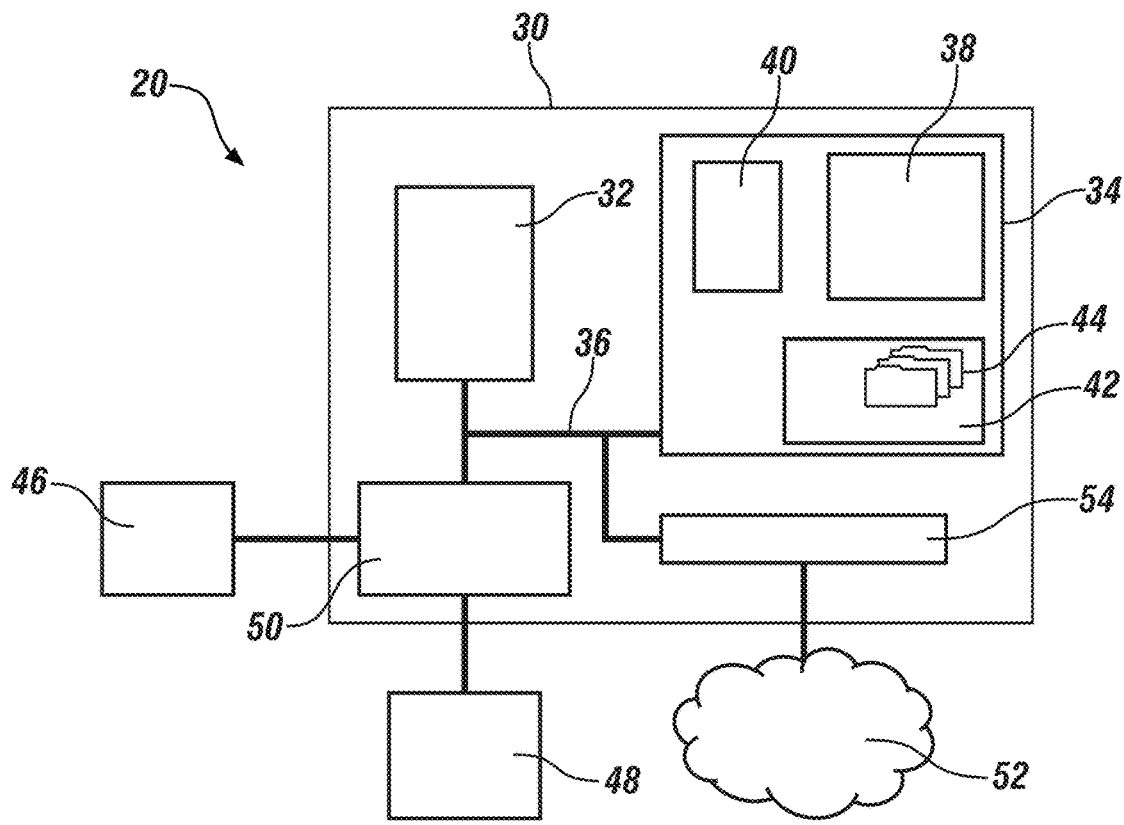
FIG. 2 depicts aspects of a mapping system including a processing device configured to analyze and merge various maps, in accordance with an aspect of an exemplary embodiment.

FIG. 2 shows an embodiment of a computer system 30 configured to perform various functions related to analyzing and merging maps. Components of the computer system 30 include one or more processors or processing units 32, a system memory 34, and a bus 36 that couples various system components including the system memory 34 to the one or more processing units 32. The system memory 34 may include a variety of computer system readable media. Such media can be any available media that is accessible by the processing unit(s) 32, and includes both volatile and non-volatile media, removable and non-removable media.

The processing unit 32 may be an on-board processing device such as the processing device 22, a processing device in a computer, laptop computer or mobile device, or a remote processing device such as a server. In addition, the processing unit 32 can include multiple processors, such as both an on-board processor and a remote processor.

For example, the system memory 34 includes a storage system 38 for reading from and writing to a non-removable, non-volatile memory (e.g., a hard drive). The system memory 34 may also include volatile memory 40, such as random access memory (RAM) and/or cache memory. The computer system 30 can further include other removable/non-removable, volatile/non-volatile computer system storage media.

As will be further depicted and described below, the system memory 34 can include at least one program product having a set (e.g., at least one) of program modules that are configured to carry out functions of the embodiments described herein.

For example, the system memory 34 stores a program/utility 42, having a set (at least one) of program modules 44. The program/utility 42 may be an operating system, one or more application programs, other program modules, and program data. The program modules 44 generally carry out the functions and/or methodologies of embodiments described herein. For example, the program modules 44 can include modules for acquiring input data (e.g., maps, location information, images, map meta-data from maps, etc.), generating merged maps, presented acquired maps and/or merged maps to a user, and others.

The one or more processing units 32 can also communicate with one or more external devices 46 such as a keyboard, a pointing device, a display, and/or any devices (e.g., network card, modem, etc.) that enable the one or more processing units 32 to communicate with one or more other computing devices. In addition, the one or more processing units 32 can communicate with one or more sensors 48, such as a camera and/or radar device. Such communication can occur via Input/Output (I/O) interfaces 50.

The one or more processing units 32 can also communicate with one or more networks 52 such as a local area network (LAN), a general wide area network (WAN), and/or a public network (e.g., the Internet) via a network adapter 54. It should be understood that although not shown, other hardware and/or software components could be used in conjunction with the computing system 30. Examples include, but are not limited to: microcode, device drivers, redundant processing units, external disk drive arrays, RAID systems, tape drives, and data archival storage systems, etc.

The map generation system 20 is configured to acquire a plurality of digital maps, which can be acquired from any suitable location or locations. Generally, a map refers to data representing a geographic region that includes indications or representations of the locations of various features. In one embodiment, the maps are transportation maps that indicate the location of features including roads, road lanes (or simply lanes), traffic flow devices, buildings, sidewalks and any other features of interest to a user. Maps can be received or acquired from any suitable location or source (for example, via the network 52), such as a vehicle navigation system, a mobile device, a server, a database, a map service and others.

For generation of a merged map, maps of various types may be available, which can have differing levels of complexity, detail, size, area and other characteristics. For example, different map types may have different resolutions. The "resolution" of a map as described herein generally refers to an amount or level of detail and accuracy of information presented by the map.

Figure 3:
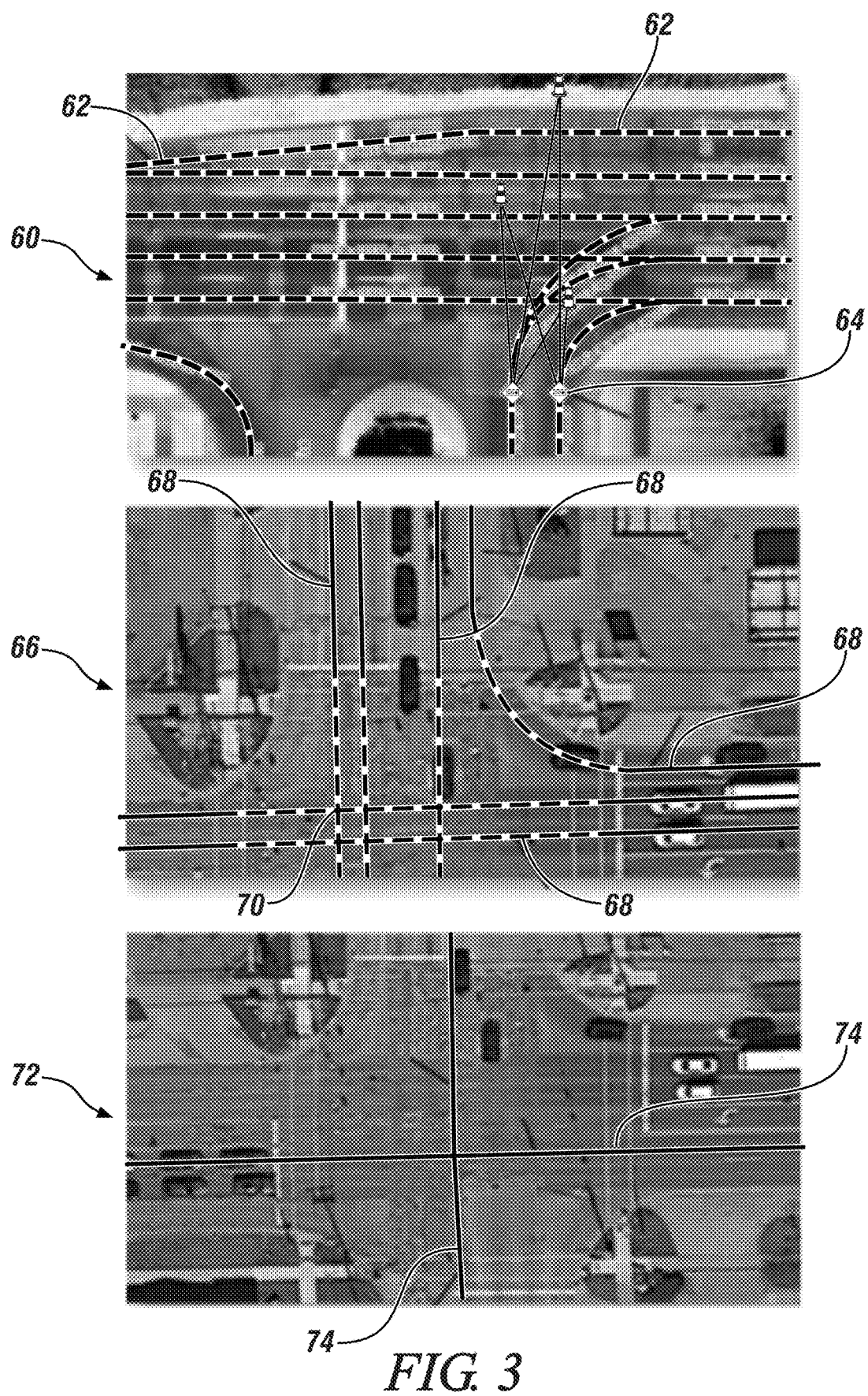
FIG. 3 depicts examples of types of maps that can be analyzed and merged by the mapping system of FIG. 2.

FIG. 3 shows examples of types of maps that can be acquired and merged according to embodiments described herein. These examples illustrate the varying levels of resolution of maps generated from various sources and processes.

The first example is referred to as a high definition (HD) map 60. The HD map 60 includes highly accurate lane locations, traffic flow indicators and lane connections. For example, the map 60 includes lane location and direction indicators 62 and traffic light indicators 64. Such high definition maps are often at least partially manually generated and typically require significant multi-mode data collection integration.

A second example is a medium definition (MD) map 66, which is an automated in-situ map which can be derived from crowd-sourced data The MD map 66 in this example was generated using a fully automated process (no human creation or editing), based on data collected from vehicle logs and navigation mapping. As such, the MD map 66 requires pre-driving the relevant roads. As shown, the MD map 66 includes lane location indicators 68 (without direction indications) showing intersections 70, and may also include additional information such as traffic light and flow control indicators.

A third example is a low definition (LD) map 72. The LD map 72 includes roadway indicators 74 that may or may not indicate separate lanes. In this example, the roadway indicators show paths of roadways without defining individual lanes, and typically the LD map 72 does not include traffic light, traffic flow information and information regarding specific objects.

It is noted that the designations of high definition, medium definition and low definition are intended to illustrate differences in definition, resolution and/or level of detail between maps. In other words, these definitions are relative and are not intended to denote an absolute measure of map definition.

Figure 4:
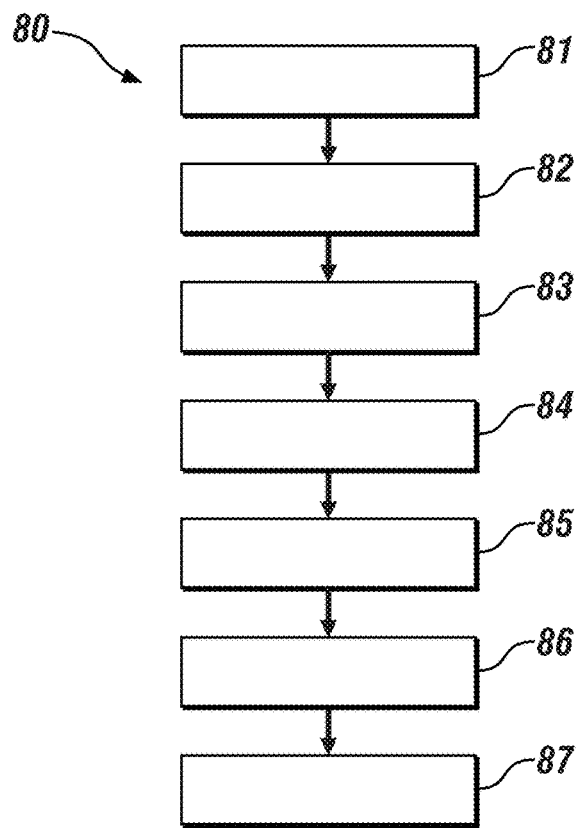
FIG. 4 is a flow chart depicting aspects of a method of analyzing and/or merging maps, in accordance with an aspect of an exemplary embodiment.

FIG. 4 depicts an embodiment of a method 80 of analyzing received maps and generating one or more merged maps based on combining objects from multiple maps. A map generated according to the method 80 is referred to herein as a "merged map." All or part of the method 80 may be performed by a processing device. For example, the method may be performed by one or more processors in the map generation system 20 and/or the computer system 30, either in full or in conjunction with a human user. The method 80 is discussed in conjunction with blocks 81-87. The method 80 is not limited to the number or order of steps therein, as some steps represented by blocks 81-87 may be performed in a different order than that described below, or fewer than all of the steps may be performed.

At block 81, the processing device collects, acquires or otherwise receives a plurality of maps of a geographic region. The plurality of maps may represent the same region or parts thereof. For example, the maps may represent different extents of a region and/or show overlapping regions. In one embodiment, at least some of the received maps are of different types and/or have different levels of resolution. For example, the processing device receives the map 66 and the map 72 and is configured to merge the map 66 and the map 72 by identifying map objects and combining the objects as discussed further below.

At block 82, the processing device identifies one or more objects in each map. Generally, an "object" is a representation of a feature shown in or associated with a map, such as a lane segment, an intersection, traffic flow information, a traffic light, a building, a sidewalk, a tree or any other feature that can be identified from the map. Objects may be identified based on map data such as meta-data, annotations and other information stored with or as part of a map image. In addition, objects may be identified by performing image analysis.

For example, the processing device identifies the various lane objects representing lane segments shown in the map 66 and parses the map 66 into constituent objects. In this example, the processing device identifies lane objects representing lane segments. Likewise, the processing device parses the lane segments shown in the map 72.

At block 83, objects from each map are compared to determine objects that represent the same or similar (i.e., common) features. Such objects are referred to herein as "inter-map objects." The processing device groups the objects into a set of objects to be combined and/or merged into a common object. A "common object" refers to a combined object representing a map feature, which results from the analysis and combination of inter-map objects as described herein.

For example, the processing device identifies a first lane segment from the map 66 and a second lane segment from the map 72 as being representative of the same feature, such as the same lane or roadway.

At block 84, for each set of inter-map objects, a subset of the set of inter-map objects is selected based on the provenance of the map that each inter-map object was selected from. A subset of a set of inter-map objects can be one of the inter-map objects, some of the inter-map objects or all of the inter-map objects in a set. In one embodiment, the subset is selected by assigning a provenance rank to each object, and removing objects from the set that have a low provenance rank.

The "provenance" of a map or object refers to the source of the map or object, and is related to the resolution of the map. For example, the maps 60, 66 and 72 are each from a different source and have associated levels of resolution.

At block 85, each object in the subset of the inter-map objects is analyzed based on one or more similarity metrics. Objects outside of a selected similarity metric value may be removed. Examples of similarity metrics include measures of alignment between a reference object in the subset and other objects in the subset, and measures of positional relationships between the other objects in the subset and the reference object. The position relationship may include a distance between each of the other objects in the subset and the reference object.

For example, if the subset of objects includes a plurality of lane segments representing a section of a lane or roadway, the similarity metric can include length, lateral distance (i.e., a distance from a point on the reference object to a point on an object in a direction perpendicular to the reference object), relative heading angle and amount of overlap. Objects in a subset that have a similarity metric outside of a selected or threshold value (for example, a lateral distance that is greater than a selected distance, or a relative heading angle that is greater than a selected angle) may be removed.

At block 86, the remaining objects in a subset are merged, for example by a weighted average to generate a common object for the associated feature. The above process is repeated for each set of inter-map objects until a common object is generated for each set of inter-map objects.

At block 87, the generated common objects, as well as individual objects (objects only appearing in one map) are used to construct a merged map.

Figure 5:
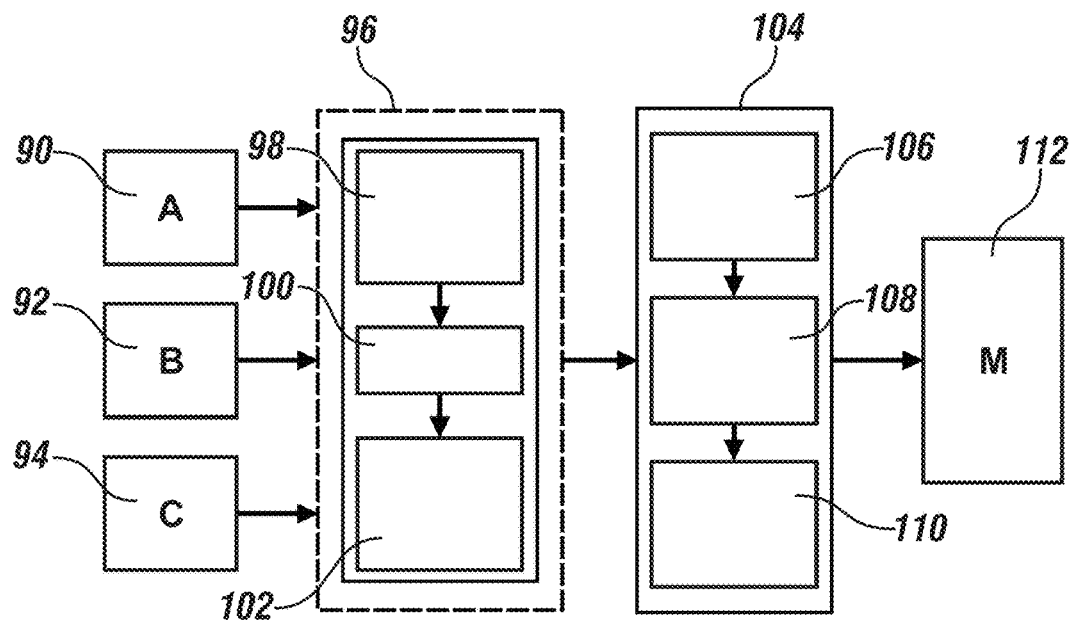
FIG. 5 is a block diagram illustrating aspects of a mapping system and a method of analyzing and/or merging maps, in accordance with an aspect of an exemplary embodiment.

FIG. 5 illustrates an example of the method 80 and examples of processing modules that can be used to perform aspects of the method 80. In this example, two maps are acquired and merged into a merged map, although it is noted that any number of maps having any type and/or resolution can be merged using the method 80.

In this example a first map 90, a second map 92 and a third map 94 are input to a categorization module 96. The first map 90 is a high definition (HD) map and is also referred to as Map A. The second map 92 is a medium definition (MD) map and is also referred to as Map B. The third map 94 is a low definition map (LD) and is also referred to as Map C.

Maps 90, 92 and 94 are parsed by parsing logic 98 into objects. Such objects can include lane segments, intersections, traffic flow objects and other objects representing features of interest. Examples of traffic flow objects include traffic lights, road markings, stop bars, sidewalks, crosswalks and others.

Comparison logic 100 compares the identified objects and determines whether objects from the maps are associated with the same or common map feature. Objects determined to represent the same feature are designated as inter-map objects and are grouped into inter-map object sets.

For example, each map 90, 92 and 94 includes various lane objects representing lanes and/or roadways. Each lane object may represent a length or segment of a lane. Lane objects may be linear (e.g., representing a straight lane segment) or non-linear (e.g., representing a curved lane or road segment or a traffic flow path in an intersection between lanes).

Figure 6:
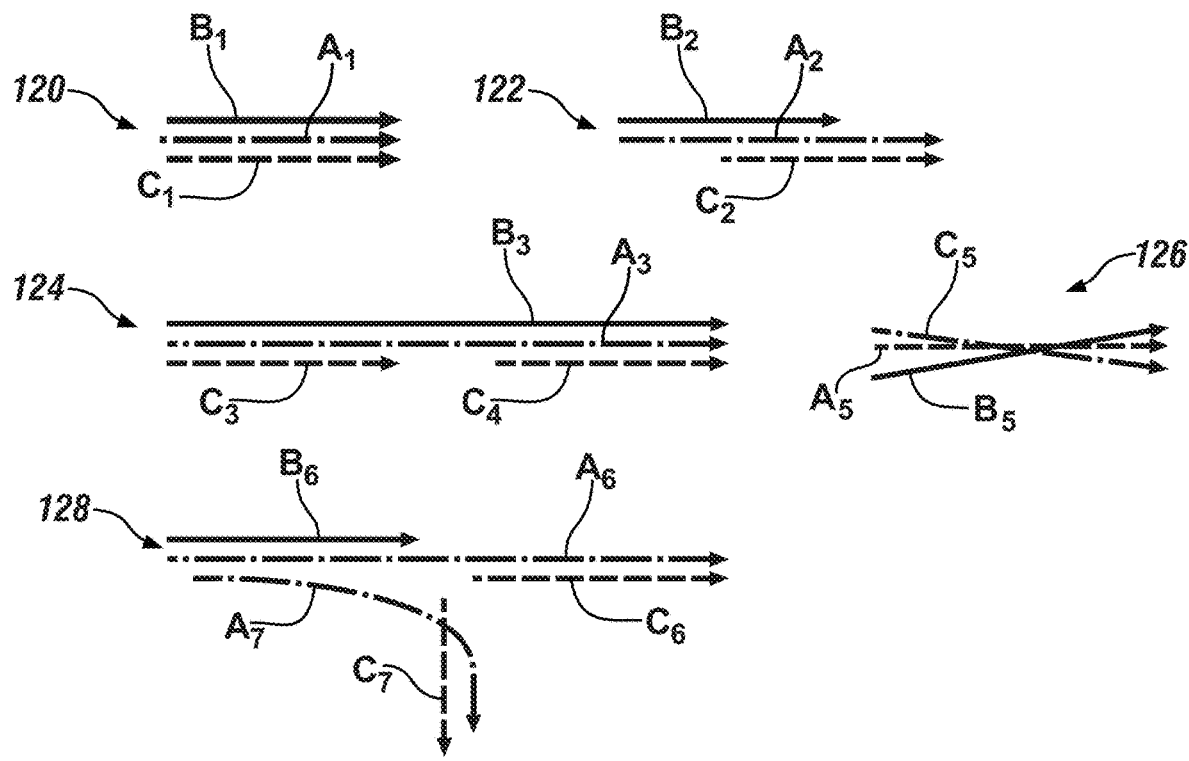
FIG. 6 depicts examples of inter-map object sets created from objects from received maps via the method of FIG. 4, in accordance with an aspect of an exemplary embodiment.

Examples of inter-map object sets are shown in FIG. 6. Maps 90, 92 and 94 are parsed into objects including lane objects. Lane objects from the map 90 (Map A) include a number n of lane segments, and each lane segment is denoted as "lane $A_i$," where i is an integer between one and n. Lane objects from the map 92 (Map B) include a number m of lane segments, and each lane segment is denoted as "lane $B_j$," where j is an integer between one and m. Lane objects from the map 94 (Map C) are parsed into a number p of lanes. Each lane is a "lane $C_k$," where j is a number between zero and p.

As shown in FIG. 6, lane objects in a particular group are generally not identical, due to different characteristics of the acquired maps 90, 92 and 94, and can have different levels of similarity. For example, the inter-map object set 120 includes lane objects $A_1$, $B_1$ and $C_1$, all of which have approximately the same length and direction, but have different lateral positions. The inter-map object set 122 includes lane objects $A_2$, $B_2$ and $C_2$, which have approximately the same length and direction, but have different lengths and starting points and ending points.

The inter-map object set 124 includes lane objects $A_3$ and $B_3$, which have approximately the same length and direction, representing a lane segment. This set also includes two lane objects $C_3$ and $C_4$, which are shorter than lane objects $A_3$ and $B_3$, and cover smaller lengths of the represented lane segment. As discussed further below, lane objects $C_3$ and $C_4$, may be merged to form a longer lane object having a length that is closer to the length of the lane segment.

The inter-map object set 126 includes lane objects $A_5$, $B_5$ and $C_5$, all of which have different angle headings. The inter-map object set 128 includes lane objects $A_6$ and $A_7$, lane object $B_6$ and lane objects $C_6$ and $C_7$, which have different lengths, different starting points and ending points, and different orientations.

Referring again to FIG. 5, each inter-map object set is categorized using categorization logic 102 based on the positional and directional relationship between constituent objects. Examples of categories for lane objects in lanes having the same direction, lanes having opposing directions, and connecting lanes. Connecting lanes generally refer to lanes that connect at an intersection or lanes that have different directions but a common connection point. For example, the inter-map object sets 120, 122, 124 and 126 can all be categorized as lanes having the same direction, and the inter-map object set 128 can be categorized as both lanes having the same direction and connecting lanes.

The categorized inter-map object sets are input to a merging module 104, which combines or merges objects in inter-map object sets into corresponding common objects that can be used to populate a merged map 112.

For each inter-map object set, prioritization logic 106 chooses one or more of the objects for use in constructing a merged map. Based on prioritization criteria, all or some of the objects in an object set are selected as a subset that will be merged. The subset may be a single object or multiple objects.

In one embodiment, the prioritization criteria include a provenance rank that is applied to each object in an inter-map object set. The provenance rank can be based on any combination of suitable factors, such as the source of the map from which an object is taken (e.g., a curated map, a crowd-sourced map, a map from a GPS navigation system and others), a resolution of the map, a size of the region depicted in each map, and others. For example, objects from curated maps are given a higher provenance rank than crowd-sourced maps, objects from maps depicting a smaller region are given a higher provenance rank, and objects from maps having higher resolution are given a higher provenance rank.

Other prioritization criteria can be employed. For example, in the case of lane objects, length is a prioritization criteria in which longer lanes are given higher priority and lanes having a greater degree of alignment to a reference object are given higher priority. Objects having lower priority may be merged or removed.

Once any desired objects have been removed, a subset of each inter-map object set is input to merging logic 108, which merges objects where appropriate or desired. Objects output from the prioritization logic 106 may be merged into a single object. For example, lane objects having similar alignment may be merged into a single common lane object in any suitable manner, such as by calculating a weighted average of angle heading and/or perpendicular distance. Appropriate tags may then be applied to each merged or common object (e.g., traffic light indicators, crosswalk tags, stop bar tags, lane indices, directional data, intersections, lane connections, etc.).

The merging module 104 may also include checking logic 110 for performing a check to ensure accuracy. Methods of checking include graph traversal or graph search techniques, such as a 2-hop lane graph check. The merged map 112 may then be output.

Figure 7:
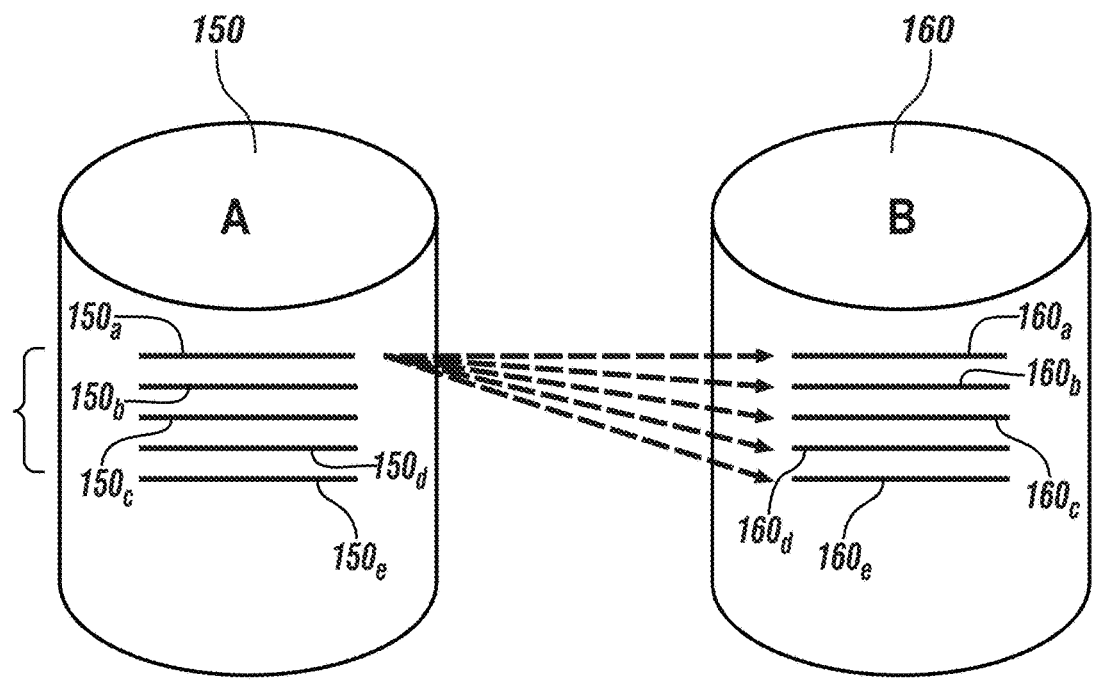
FIG. 7 depicts aspects of an example of a method of merging maps, in accordance with an aspect of an exemplary embodiment.
Figure 8:
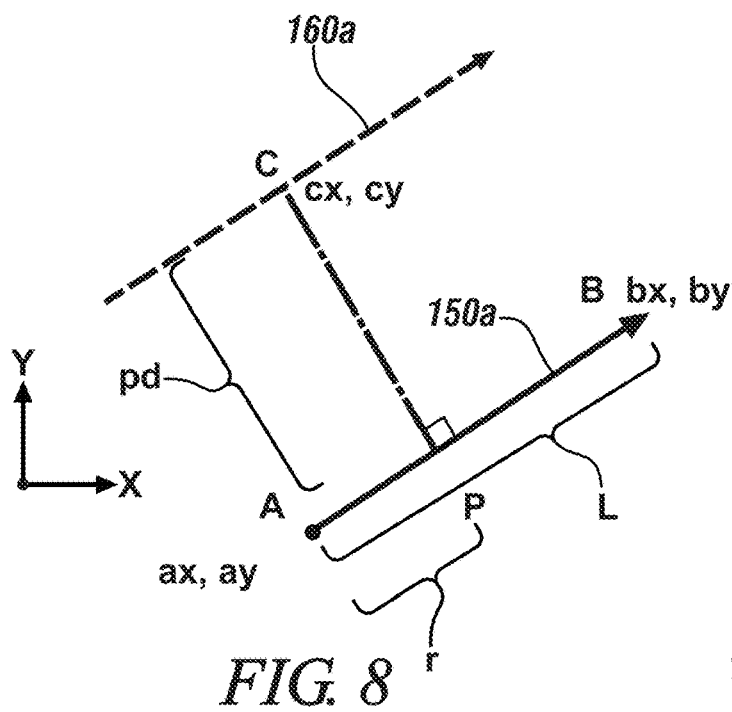
FIG. 8 depicts aspects of an example of calculations used to merge objects from multiple maps, in accordance with an aspect of an exemplary embodiment.
Figure 9:
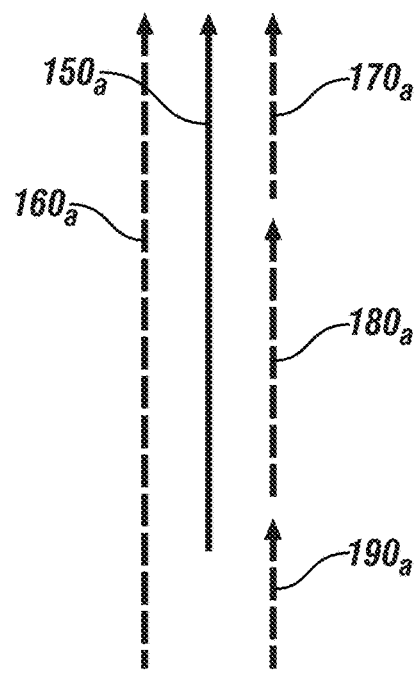
FIG. 9 depicts an example of merging objects from multiple maps, in accordance with an aspect of an exemplary embodiment.

FIGS. 7-9 show an example of a merging process for lane objects between a first map 150 and a second map 160. As shown in FIG. 7, the map 150 includes lanes 150a, 150b, 150c, 150d and 150e, each representing a respective lane segment. The map 160 includes lanes 160a, 160b, 160c, 160d and 160e, each representing a respective lane segment.

FIG. 8 shows examples of the calculation of similarity metrics to assess the similarity between two objects. These examples are discussed in conjunction with estimating similarity between two lane objects (i.e., lane object 150a and lane object 160a). The objects are shown in a two-dimensional space having orthogonal axes x and y. In this example, the lane object 150a is selected as a reference object, and extends from point A $(a_x, a_y)$ to point B $(b_x, b_y)$.

One similarity metric is an alignment metric r, which is a distance from point A to a point P on the lane object 150a. The location of the point P, and thus the value of the distance r is indicative of an alignment between the lane objects 150a and 160a. The distance r is based on a scalar projection of the lane object 160a onto the lane object 150a, and can be calculated based on the following equation:

$$r = \frac{a \cdot ab}{\|ab\|^2}. \quad (1)$$

If r equals zero, the point P coincides with point A, and the lane object 160a is perpendicular to the lane object 150a (potentially indicating a connected lane set). If r equals one, the lane object 160a is fully aligned with the lane object 150a. If r is greater than zero, the point P is located on a backward extension of the lane object 150a, and if r is less than zero, the point P is located on a forward extension of the lane object 150a (i.e., in the direction of the arrow). If r is between zero and one, the point P is between points A and B.

Another metric that can be used to evaluate similarity is a length L of each lane object. The length L can also be used to evaluate priority as discussed above. For example, the length L of the lane object 150a is calculated as follows:

$$L = \text{sqrt}((b_x - a_x)^2 + (b_y - a_y)^2). \quad (2)$$

Another similarity metric is a perpendicular distance (pd) between lane objects. pd is calculated based on the value s, which indicates the location of point C relative to point P, and is calculated using the following equation:

$$s = \frac{(a_y - c_y)(b_x - a_x) - (a_x - c_x)(b_y - a_y)}{L^2}. \quad (3)$$

If s equals zero, point C is on point P. If s is less than zero, point C and the lane object 160a are to the left of point P along the perpendicular line extending from point P. If s is less than zero, point C and the lane object 160a are to the right of point P along the perpendicular line.

The perpendicular distance pd can be calculated as follows:

$$pd = |s| * L. \quad (4)$$

FIG. 9 depicts an example of a merge process using the similarity metrics of length and perpendicular distance. Other similarity metrics such as angle heading can be similarly used. An inter-map object set is created that includes the lane object 150a, the lane object 160a, and lane objects 170a, 180a and 190a, which were collected from other maps.

The inter-map object set is created by selecting the lane objects 150a, 160a, 170a, 180a and 190a based on their corresponding map feature. In this example, the lane index for each lane object 150a, 160a, 170a, 180a and 190a is checked to determine that the above lane objects correspond to the same feature. The provenance of each lane object 150a, 160a, 170a, 180a and 190a is also determined.

Each lane object 150a, 160a, 170a, 180a and 190a is given a priority rank or level based on provenance and length. The lane object 150a was taken from a high definition map having a high provenance rank and is given a high priority. Lane object 160a was taken from a medium definition map and is given a lower priority. The lane objects 170a, 180a and 190a have priority ranks that are lower than that of lane objects 150a and 160a. The lane object having the highest priority rank (in this example, lane object 150a) is selected as a reference lane object.

As shown in this example, the lane objects 150a, 160a, 170a, 180a and 190a are generally parallel. The pd from each lane object 160a, 170a and 180a and 180b to the lane object 150a is estimated, and lane objects within a selected pd value (e.g., 5 meters) are retained. Any objects outside of the selected pd may be removed. In this example, all of the shown lane objects 150a, 160a, 170a, 180a and 190a are within the selected pd value.

Lane objects having relatively short lengths may be merged if applicable. For example, the length of the lane objects 170a, 180a and 190a are significantly shorter and have the same lateral position (i.e., the same pd), and thus they may be merged into a single, longer lane. The remaining lane objects in the inter-map object set (lane object 150a, lane object 160a and the lane object created by merging lane objects 170a, 180 and 190a) are then combined to generate a final merged object. For example, the lateral position of the lane objects can be averaged to obtain a merged or common lane object.

Figure 10:
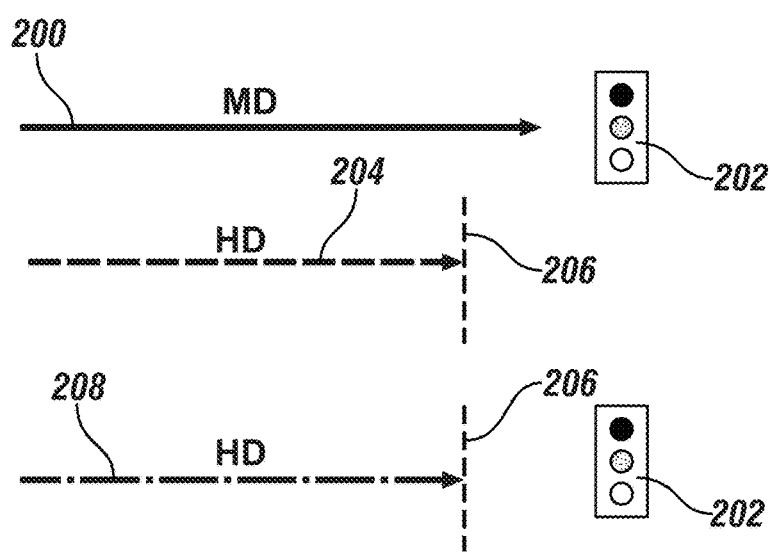
FIG. 10 depicts a result of an example of merging multiple maps, in accordance with an aspect of an exemplary embodiment.

FIG. 10 shows examples of merged lane objects and illustrate aspects of constructing a merged map. Generally, the map merging process includes merging waypoints and edge points of received maps, and populating the merged map with various available objects. For example, as shown in FIG. 10, a lane object 200 representing a lane segment and a traffic light object 202 are taken from a first acquired map (a MD map, not shown). A lane object 204 and a stop bar object 206 are taken from a second map (a HD map, not shown). The lane objects 200 and 204 are collected in an inter-map object set, are given priority ranks and are merged as discussed above. For example, the lateral position of the lane objects 200 and 204 are merged by calculating a weighted average of the lateral positions. The weight applied to each lane object 200 and 204 may be based on length and/or priority rank. The resultant merged lane object 208 is generated.

Merged lane objects may be adjusted, for example, by trimming or extending lane lines to create connections between lane objects. For example, when the lane object 208 is merged into the merged map, the lane object 208 can be trimmed to terminate at the stop bar object 206.

Other adjustments may be made as the merged map is constructed. For example, parallel lane lines can be indexed (e.g., to denote lane position in a road). Upstream and downstream lanes can be merged. For objects having different provenances, new connections can be made where needed. Other related objects can be merged (e.g., traffic light indicators), and intersections and incoming lanes may also be merged.

As noted above, embodiments may include performing a check on a merged map to ensure accuracy. The following is an example of such a check. This example is provided for illustration purposes and is not intended to be limiting, as a check can be performed in various other ways.

In this example, the check includes looping through all of the merged lane objects. Parallel left and right lanes and connecting lanes are checked for any old references (if so, replace the old reference with a new one if available), lanes are checked to ensure that they are consistently trimmed, edge types are aligned and lane indices are ordered properly. In addition, intersections are checked to ensure that they are correctly associated, and all incoming lanes in an intersection are correct. Embodiments described herein have numerous advantages. For example, the embodiments provide a way to efficiently merge maps of different types and resolutions. In order to create real world mapping and navigation systems, it is often necessary to fuse maps of varying types, levels of detail and accuracy. Incompatibility between map types can pose many challenges, which are addressed by embodiments described herein. In addition, the map merging methods and processes described herein provide for an effective way to smoothly transition between incompatible map systems.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for generating a map, comprising:
a processing device including an input module having a processor configured to receive a plurality of maps of a region, the processing device configured to perform:
determining a provenance of each received map of the plurality of maps, the provenance determined based on at least one of a source and a resolution of each received map;
parsing each received map into objects of interest representing features of interest in the region, wherein the objects of interest include one or more lane objects, each one or more lane object representing a segment of a road lane;
comparing the objects of interest from the plurality of maps to identify one or more sets of objects, each set of objects representing a common feature;
for each set of objects, performing:
selecting a subset of the set of objects based on a provenance rank associated with each object in the set of objects, the provenance rank of an object based on the resolution of a received map that includes the object;
selecting an object from the subset as a reference object, and estimating a distance from the reference object to each other object in the subset, wherein the reference object is selected based on the provenance associated with the reference object and a length of the reference object;
calculating a similarity metric for each object in the subset, the similarity metric selected from at least one of: an alignment between an object in the subset and the reference object in the subset, and a positional relationship between the object in the subset and the reference object in the subset;
generating a common object representing the common feature from at least one object in the subset based on the similarity metric; and
generating a merged map including the common object.

2. The system of claim 1, wherein the processing device is configured to estimate a length of each object in the subset, and merge objects having a length that is shorter than a selected length.

3. The system of claim 1, wherein the processing device is configured to generate the common object based on calculating a weighted average of a lateral position of each object relative to the reference object.

4. The system of claim 3, wherein calculating the weighted average includes assigning a weight to each object in the subset based on the provenance.

5. The system of claim 1, wherein the similarity metric for each object in the subset is an alignment metric based on at least one of: a projection of each object onto the reference object, and an angular heading of each object relative to the reference object.

6. The system of claim 1, wherein the processing device is part of a vehicle or in communication with the vehicle.

7. A method for generating a map, comprising:
receiving a plurality of maps of a region by a processing device;
determining a provenance of each received map of the plurality of maps, the provenance determined based on at least one of a source and a resolution of each received map;
parsing each received map into objects of interest representing features of interest in the region, wherein the objects of interest include one or more lane objects, each one or more lane object representing a segment of a road lane;

comparing the objects of interest from the plurality of maps to identify one or more sets of objects, each set of objects representing a common feature;

for each set of objects, performing:

selecting a subset of the set of objects based on a provenance rank associated with each object in the set of objects, the provenance rank of an object based on the resolution of a received map that includes the object;

selecting an object from the subset as a reference object, and estimating a distance from the reference object to each other object in the subset, wherein the reference object is selected based on the provenance associated with the reference object and a length of the reference object;

calculating a similarity metric for each object in the subset, the similarity metric selected from at least one of: an alignment between an object in the subset and the reference object in the subset, and a positional relationship between the object in the subset and the reference object in the subset;

generating a common object representing the common feature from at least one object in the subset based on the similarity metric; and generating a merged map including the common object.

8. The method of claim 7, wherein generating the common object includes estimating a length of each object in the subset, and merging objects having a length that is shorter than a selected length.

9. The method of claim 7, wherein the common object is generated based on calculating a weighted average of a lateral position of each object relative to the reference object.

10. The method of claim 9, wherein calculating the weighted average includes assigning a weight to each object in the subset based on the provenance.

11. The method of claim 7, wherein the similarity metric for each object in the subset is an alignment metric based on at least one of: a projection of each object onto the reference object, and an angular heading of each object relative to the reference object.

12. The method of claim 7, wherein the processing device is part of a vehicle or in communication with the vehicle.

* * * * *